Nov. 1, 1938.   H. GRIFFIN ET AL   2,134,916
FILM PROJECTING MECHANISM
Filed Oct. 31, 1935
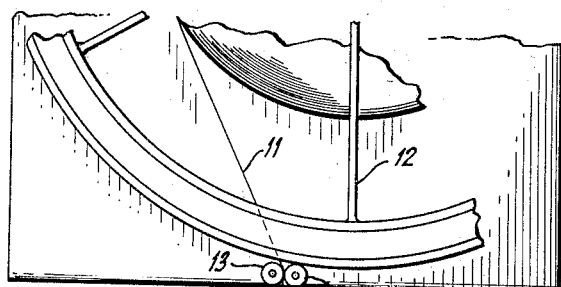
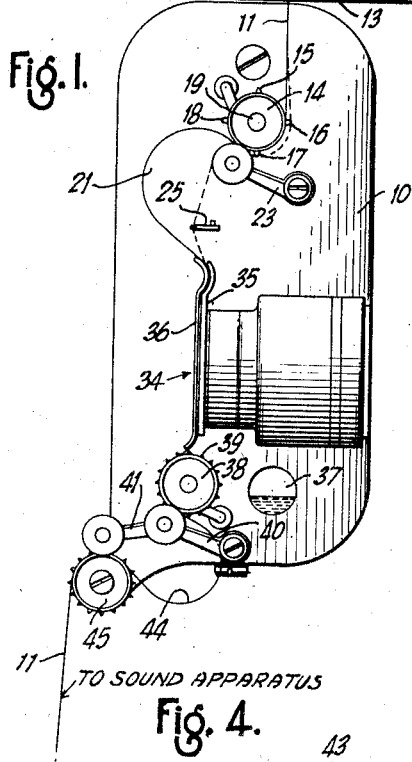
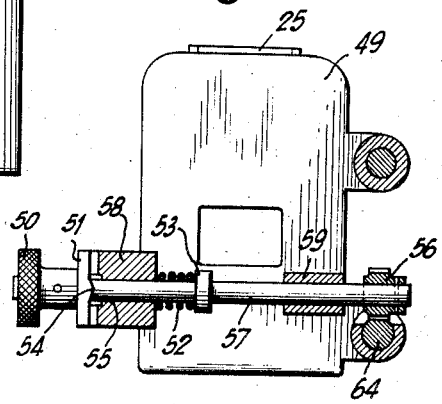
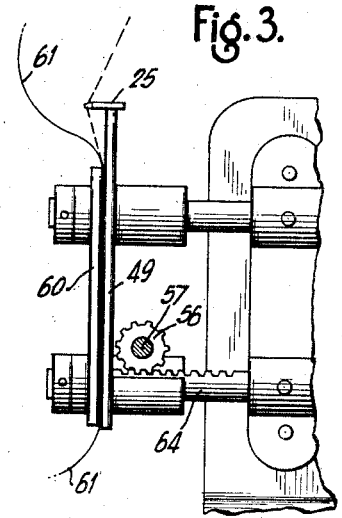
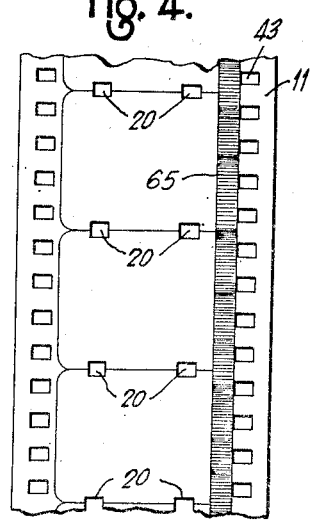
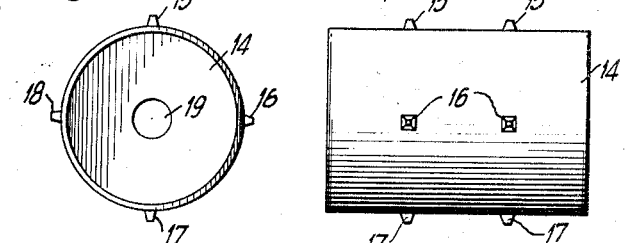
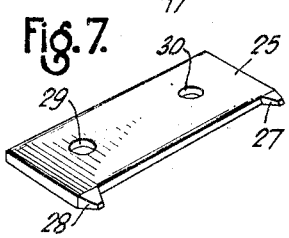
INVENTORS
Herbert Griffin
Albert Kindelmann
BY Austin & Dix
ATTORNEYS Patented Nov. 1, 1938

2,134,916

UNITED STATES PATENT OFFICE 2,134,916

FILM PROJECTING MECHANISM

Herbert Griffin, Jersey City, N. J., and Albert Kindelmann, Floral Park, N. Y., assignors to International Projector Corporation, New York, N. Y., a corporation of Delaware Application October 31, 1935, Serial No. 47,532

4 Claims. (Cl. 88—17)

This invention relates to motion picture projectors and more particularly to motion picture projectors for use with noninflammable film.

The motion picture industry has been required to use fire-proof projection booths when inflammable film is projected. There has been provided in the industry, a noninflammable film, but it does not serve the commercial requirements to as good an advantage as the inflammable film. The projection machine using the non-inflammable film does not require the fire-proof booth.

A main feature is the provision of a projection machine that, because of its construction, will not project inflammable film which may be threaded through the machine.

Another feature of the invention is the provision of an improved projection machine constructed only for use with a distinctive type of film so that the substitution of another type of film can be readily detected.

A still further and more specific feature of the invention is to provide an improved projection machine for use only with the noninflammable film and will destroy inflammable film which may be threaded into the projector.

Another feature of this invention is to provide an improved projection machine which has a portion thereof that comes into operation only when the wrong film is in the machine and this portion of the machine then acts to prevent the film from passing through the projector. In the preferred structure set forth herein, the portion acts to break the film.

Further advantages and features of the invention will become more apparent from the following detailed description of the use of the drawing.

Referring now to the drawing which represents forms of the invention:

Fig. 1 is a side elevation of a portion of a motion picture projection machine with a film threaded therethrough;

Fig. 2 is a rear elevation of a film gate incorporating the invention;

Fig. 3 is a side elevation of Fig. 2;

Fig. 4 is a plan view of a portion of film;

Fig. 5 is a side elevation of a sprocket;

Fig. 6 is a front elevation of the sprocket shown in Fig. 5; and

Fig. 7 is a perspective view of a film-destroying element.

The motion picture projection machine shown in Fig. 1 is similar to those used in the moving picture industry for the projection of inflammable film. When this projector is used with inflammable film the fire laws require that a fireproof projection booth be used. A booth is not necessary when non-inflammable film is used. However, due to the fact that it is impossible to keep constant inspection over these projectors, it quite frequently happens that the projectors designed to use only non-inflammable film are used with inflammable film without a fireproof booth. A further difficulty in preventing this unlawful use of the film and projector arises from the fact that there is very little actual visible difference between non-inflammable film and inflammable film. This slight difference makes it difficult to detect inflammable film even though the projector is inspected.

This invention is designed to overcome these difficulties by constructing the projection machine so that it will not operate with inflammable film, that the projector will destroy inflammable film, and that by designing non-inflammable film so that it can readily be differentiated from inflammable film.

In Fig. 1 of the drawing showing a projection machine for projecting non-inflammable film, the film 11 is threaded through the projector. When threading the film it is unwound from the supply reel 12, and then passed through the rollers 13. The film 11 is then passed around supply sprocket 14 where the teeth 15, 16, 17, and 18 engage at various times the sprocket holes 20. The pad roller 23 holds the film 11 in close contact with the sprocket 14 so that the sprocket holes in the film will constantly engage the sprocket teeth.

Before the film is passed through the film gate 34 the upper loop 21 is formed. The film, in passing through the film gate 34 moves between the stationary guide plate 36 and moveable guide plate 35. The film next passes around the intermittent feed sprocket 38 where the teeth 39 of the sprocket engage the sprocket holes 43. The film then is formed into the lower loop 44 and then around sprocket 45, and then to the sound gate. The pad rollers 40 and 41 hold the film in contact with the sprockets 38 and 45, respectively, which in turn hold the sprocket holes in engagement with the sprocket teeth.

Figs. 5 and 6 of the drawing show the construction of the supply sprocket 14 with the teeth 15, 16, 17, and 18, preferably placed at the quarter points of the circumference of the sprocket so that the teeth will fit the sprocket holes 20 of the film shown in Fig. 4. It will be noted that the sprocket holes in the film for the teeth 15 to 18 fall at the beginning and end of each exposure. The sprocket holes are so placed, longitudinally, as to fall at approximately one-third distance from the edge of the film.

The sprocket 14 driven by the shaft 19 engages only the sprocket holes 20 of the film 11 while the feed sprocket 38 engages only the sprocket holes 43 of the film. The lower sprocket is designed after the conventional sprocket now in use with 16 teeth and are mounted close to the edge to engage sprocket holes 43 shown in Fig. 4.

The film to be used in the operation of the improved projection machine in this invention is the design shown in Fig. 4. However, any variation of design may be employed if made in accordance with the invention and if made for non-inflammable material. With the proper type of film in use, the projector will draw the film from the reel by means of sprocket 14 and will draw the film through the film gate by means of intermittent feed sprocket 38.

If, however, the projectionist should attempt to substitute inflammable film with only the sprocket holes 43, the projector will not operate. The sprocket 14 requires sprocket holes 20 in order to draw the film from the supply reel 12, and without the provision of these sprocket holes the sprocket will rotate without moving the film with it. At the same time intermittent sprocket 38 is designed to operate on the sprocket holes 43 and will therefore pull the film through the film gate 34 even though the supply sprocket 14 does not draw film 11 from the supply reel 12. Under these circumstances the result of the operation of sprocket 38 and the inoperation of sprocket 14 is to eliminate the upper loop 21.

A destroying element 25 is placed in the projector head at a suitable place to engage and destroy the film. This element is preferably placed within the upper loop 21 and between the gate 34 and the sprocket 14. Fig. 7 illustrates one form of the destroying element which is made of any type of rigid material, rectangular in shape and with two protruding engaging members 27 and 28. This element 25 is provided with two drilled holes, 29 and 30, for making it fast in a portion of the head of the projector.

The elimination of the upper loop 21 by the pull of sprocket 38 when inflammable film is used, causes the film to be drawn from the pad roller 23 across the face of the destroying element 25. The projections or teeth 27 and 28 will engage the sprocket holes 43 and hold the film. The sprocket 38 will continue to rotate while the destroying element holds the film. The result is that the pull on the film becomes so great that the sprocket holes 43 will tear and the film will part across its width.

It will therefore be seen that whenever inflammable film is threaded through the projection machine, the projector will fail to operate and the film will be destroyed.

When the destroying element 25 is mounted on gate plate 49 as indicated in Figs. 2 and 3, and in order to prevent any movement or opening of the film gate by movement of guide plate 49, due to the tension against the destroying element while the film is being torn, and to insure operation of the destroying element, the gate is provided with a suitable locking means such as is shown in Figs. 2 and 3. The gate plate 49 is shown in locked position at one end so that it would be in closed position against plate 60 with the film 61 between them. To open the film gate it is only necessary to turn the knob 50 so that the lateral surfaces of the projection 54 will move against the surfaces of the notch 55 and cause the shaft 57 to move longitudinally. By continuing to turn the knob 50 the gear 56 will move the gate 49 along shaft 64 in a direction away from the closed position, all as shown in Dina Patent No. 1,856,069, May 3, 1932. The shaft 57 is mounted by means of the two bosses 58 and 59. A compression spring 52 is interposed between boss 58 and collar 53 so that there is always a pressure exerted toward the right. It will be seen then that there is always a pressure exerted to bring the locking element back to locked position as well as to make it necessary to exert considerable pressure on the knob 50 in order to move the gate 49 from its closed position. As the knob 50 is turned the projection 54 will again engage the notch 55 and lock the gate after a one-half turn has been completed.

It will be seen that the locking mechanism will hold the gate 49 with the destroying element 25 mounted thereon securely in place against any pressure exerted against it during the time that the destroying element is tearing the inflammable film. This will insure operation of the destroying element 25 whenever inflammable film without the slots 20 is used in a non-inflammable projector.

While the destroying element is noted in one instant, Figs. 2 and 3, as being mounted on a moveable gate guide or member, it will be noted that it may be mounted on part of the stationary part of the projector as in Fig. 1.

It may be observed that it would be a very simple matter to try to remove sprocket 14 and replace it with a sprocket of the ordinary type which engages only the sprocket holes 43 along the side. The city and State inspection provides for this contingency by requiring a single manufacturer for the sprockets 14, and by registering all projection machines having these improved sprockets mounted therein. Such sprockets are assembled on the machine in such a manner that they will have to be destroyed to be removed. And further, in removing the sprockets, a very large part of the projecting head of the projection machine must be disassembled. Thus, it will be seen that one of the new and improved sprockets cannot be readily replaced by an old type sprocket and thereby let the machine be operated with inflammable film without having a fireproof booth.

In a further manner of protecting the public against fire hazards, the inspection departments have appointed only certain persons or concerns to perforate the film with sprocket holes to receive the teeth 15 to 18 of sprocket 14. Further, the appointed persons or concerns are required to register the films they have especially perforated.

With the improved sprocket and destroying element cooperating, it will be noted that the public is protected against a very dangerous fire hazard. Further, this improved structure of projection machines will make it much easier and at much less cost to project educational and sales films in schools and at conventions respectively, and at other meetings for any other purposes where it is not desired or possible to have a fireproof booth around the projection machine.

Referring now to Fig. 4, it will be noted that there is provided a novel sound film with the ordinary sprocket holes 43 for moving the film past certain portions of the projection machine. This novel sound film is also provided with a sound track 65. In addition to the side sprocket holes and the sound track, the film is provided with other holes or perforations, such as holes 20 for instance, for moving this sound film past another portion of the projection machine; otherwise the film will not pass through the machine properly, as set forth above.

Thus there is provided a new and novel sound film having the sound track thereon, and having the ordinary edge sprocket holes, and having other or special sprocket holes provided for a very definite purpose of protection to the public and acting under normal circumstances to move this sound film through a particular part of the projecting apparatus or machine.

It will be noted that in the disclosure herein made the sprocket holes 20 are located between the exposures on the film. It will further be noted that there are at least two of these holes 20 along the line between the exposures so that the film will be pulled or moved through part of the machine without twisting, and thus the pulling of the film by the teeth in sprocket holes 20 will be even. An equivalent of the two or more sprocket holes 20 would be the provision of one sprocket hole other than sprocket holes 43 for pulling the film and in addition have an idler, or non-driving sprocket, of a nature known to this industry, located so as to engage the film through sprocket holes 43 and thereby keep the film moving evenly and without twisting. Other equivalent forms may be employed for giving the same results. One or more of these holes 20 may be positioned elsewhere than on the line between the exposures, for instance, at points somewhat near sprocket holes 43, even at points between the exposures.

In accord with the showing in Fig. 4, it will be noted that the centers of the openings or holes 20 fall on the divisions between the exposures on the film, and also it will be noted in this disclosure that these openings or holes 20 are located at points between the rows of sprocket holes 43.

It will be further noted that the centers of the holes 20 are in the horizontal line between exposures. If desired the holes 20 may be spaced so that there is only one hole in each of the lines between the exposures, and such single holes may be in line under each other, or they may alternate and be to the right between two exposures and at the left at the next succeeding line between exposures.

It will be noted that a feature of the invention resides in the provision of a motion picture projection machine which uses a noninflammable film, and that the film by its design and construction can very readily be distinguished from an inflammable film.

It will also be noted that there is provided a motion picture projector that will operate when noninflammable film is used, but will not operate when inflammable film is used.

A very important feature is the provision of a motion picture projector which will not operate when inflammable film is used and which will destroy the inflammable film if an attempt is made to use the inflammable film.

In addition, the device is simple and inexpensive to build and assemble; it is efficient in its operation and is an aid to the elimination of the practice of using inflammable film without using proper fire precautions.

While the invention is set forth herein as showing a particular type of film-destroying means mounted in two possibly different positions, it will be understood that other types of film-destroying or film-stopping means may be employed to obtain like results.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention.

What is claimed is:

1. In a motion picture projection machine for use with film having a plurality of rows of apertures, a film gate, feeding means for positively engaging one of said rows of apertures to feed the film forward to form a loop between the feeding means and the film gate, means for positively engaging another of said rows of apertures to move the film past the film gate and means to tear said film between the first feeding means and the film gate if the second means is operated while the first means is inoperative.

2. In a motion picture projection machine for use with film having a plurality of rows of apertures, a film gate, feeding means for positively engaging one of said rows of apertures to feed the film forward to form a loop between the feeding means and the film gate, means for positively engaging another of said rows of apertures to move the film past the film gate and stationary means to engage the film and tear it between the first feeding means and the film gate if the first feeding means is inoperative.

3. In a motion picture projection machine for use with film having a plurality of rows of apertures, means for positively engaging one of said rows of apertures to feed the film forward to form a loop, means for positively engaging another of said rows of apertures to move the film through the projection machine and destroying means to project into some of said apertures and hold the film immovable if the loop is eliminated, the film being torn if the second means is operated while the destroying means engages the film.

4. In a motion picture projection machine for use with film having a plurality of rows of apertures, means for positively engaging one of said rows of apertures to feed the film forward to form a loop, means for positively engaging another of said rows of apertures to move the film through the projection machine and destroying means having punches thereon to project into some of said apertures and hold the film immovable if the loop is eliminated, the film being torn if the second means is operated while the punches engage within apertures of the film.

HERBERT GRIFFIN.
ALBERT KINDELMANN.